US007867616B2

(12) United States Patent
Harutyunyan

(10) Patent No.: US 7,867,616 B2
(45) Date of Patent: Jan. 11, 2011

(54) CARBON SINGLE-WALLED NANOTUBES AS ELECTRODES FOR ELECTROCHROMIC GLASSES

(75) Inventor: Avetik Harutyunyan, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/155,801

(22) Filed: Jun. 17, 2005

(65) Prior Publication Data

US 2006/0284538 A1 Dec. 21, 2006

(51) Int. Cl.
*B32B 9/00* (2006.01)
(52) U.S. Cl. .......................... 428/408; 977/742; 359/265
(58) Field of Classification Search ................ 428/408; 977/344, 742; 427/447; 313/495; 423/447.1; 359/265; 136/263
See application file for complete search history.

(56) References Cited

U.S. PATENT DOCUMENTS

| | | | |
|---|---|---|---|
| 5,424,054 A | 6/1995 | Bethune et al. | |
| 6,217,843 B1 | 4/2001 | Homyonfer et al. | |
| 6,280,697 B1 | 8/2001 | Zhou et al. | |
| 6,426,134 B1 | 7/2002 | Lavin et al. | |
| 6,630,772 B1 * | 10/2003 | Bower et al. | 313/311 |
| 6,692,663 B2 | 2/2004 | Zhou et al. | |
| 6,747,780 B2 | 6/2004 | Xu et al. | |
| 6,921,575 B2 * | 7/2005 | Horiuchi et al. | 428/367 |
| 2002/0049134 A1 | 4/2002 | Imazato | |
| 2002/0172639 A1 | 11/2002 | Horiuchi et al. | |
| 2005/0000830 A1 | 1/2005 | Glatkowski et al. | |
| 2005/0174040 A1 * | 8/2005 | Jung et al. | 313/495 |
| 2007/0188845 A1 * | 8/2007 | Xu et al. | 359/273 |

OTHER PUBLICATIONS

Bethune, D.S. et al., "Cobalt-Catalysed Growth of Carbon Nanotubes with Single-Atomic-Layer Walls", Nature, Jun. 17, 1993; pp. 605-607, vol. 363.
"Electronic Smart Classes". GlassOnWeb.com, 2000-2004, [online], Retrieved from the Internet, 3 pages.
Harutyunyan, A. et al., "CVD Synthesis of Single Wall Carbon Nanotubes Under 'Soft' Conditions," NanoLetters, 2002, pp. 525-530, vol. 2, No. 5.
Iijima, Sumio et al., "Single-Shell Carbon Nanotubes of 1-Nm Diameter", Nature, Jun. 17, 1993, pp. 603-605, vol. 363.
Ivanov, V. et al. "The Study of Carbon Nanotubles Produced by Catalytic Method", Elsevier Science B.V., Chemical Physics Letters, Jun. 24, 1994, pp. 329-335, vol. 223.
Journet, C. et al., "Large-Scale Production of Single-Walled Carbon Nanotubes by the Electric-Arc Technique", Nature, Aug. 21, 1997, pp. 756-758, vol. 388.
Li, W.Z. et al., "Large-Scale Synthesis of Aligned Carbon Nanotubes," Science, Dec. 6, 1996, pp. 4, 1701-1703, vol. 274.

(Continued)

*Primary Examiner*—David R Sample
*Assistant Examiner*—Daniel Miller
(74) *Attorney, Agent, or Firm*—Fenwick & West LLP; Mark E. Duell

(57) ABSTRACT

Electrochromic (EC) glass having carbon single-walled nanotubes as the electrodes (SWNTs) is disclosed. Methods and processes for preparing EC glass having SWNTs are also disclosed. The SWNTs, synthesized by any one of the art methods, are deposited on the glass to provide a transparent and electrically conductive substrate for use in EC glass.

8 Claims, 1 Drawing Sheet

Structure of Electrochromic Glasses

OTHER PUBLICATIONS

Thess, Andreas et al., "Cryitalline Ropes of Metallic Carbon Nanotubes", Science, Jul. 26, 1996, pp. 483-487, vol. 273.

PCT International Search Report and Written Opinion, PCT/US2006/023343, Nov. 3, 2008, 9 pages.

* cited by examiner

Structure of Electrochromic Glasses

CARBON SINGLE-WALLED NANOTUBES AS ELECTRODES FOR ELECTROCHROMIC GLASSES

FIELD OF INVENTION

The present invention relates to methods for controlling the reflectance and/or transmission of electromagnetic radiation, and devices, such as smart windows, optical attenuators and displays, or adjustable mirrors.

BACKGROUND

Electrochromic glass, commonly referred to as smart windows, change their tinting level or opacity when exposed to light, heat or electricity. Electrochromic (EC) windows find use in controlling the amount of daylight and solar heat gain through the windows of buildings and vehicles, and can save substantial amounts of energy. Several different types of EC materials are known. The three primary types are inorganic thin films, organic polymer films, and organic solutions. Smart windows are generally made by having two outside transparent layers between which is a counter-electrode layer and an EC layer, between which is disposed an ion conductor layer. When a low voltage is applied across the outer conductors, ions move from the counter-electrode to the EC layer causing the assembly to change color. An advantage of EC window is that it only requires electricity to change its opacity, but not to maintain a particular shade.

EC glass typically uses metal oxides as electrodes. The metal oxides have the disadvantage of reacting with chemical agents, such as the electrolytes, in the EC layer, and they add significant weight to the EC glass. Thus, alternatives are needed to the use of metal oxides as electrodes. One possibility is to replace the metal oxides with carbon nanotubes.

Carbon nanotubes are hexagonal networks of carbon atoms forming seamless tubes with each end capped with half of a fullerene molecule. (see Iijima et al. Nature 363:603 (1993); Bethune et al., Nature 363: 605 (1993) and U.S. Pat. No. 5,424,054). Presently, there are three main approaches for the synthesis of single- and multi-walled carbon nanotubes. These include the electric arc discharge of graphite rod (Journet et al. Nature 388: 756 (1997)), the laser ablation of carbon (Thess et al. Science 273: 483 (1996)), and the chemical vapor deposition of hydrocarbons (Ivanov et al. Chem. Phys. Lett 223: 329 (1994); Li et al. Science 274: 1701 (1996)). Multi-walled carbon nanotubes can be produced on a commercial scale by catalytic hydrocarbon cracking while single-walled carbon nanotubes are still produced on a gram scale.

Generally, single-walled carbon nanotubes are preferred over multi-walled carbon nanotubes because they have unique mechanical and electronic properties. Defects are less likely to occur in single-walled carbon nanotubes because multi-walled carbon nanotubes can survive occasional defects by forming bridges between unsaturated carbon valances, while single-walled carbon nanotubes have no neighboring walls to compensate for defects. Defect-free single-walled nanotubes are expected to have remarkable mechanical, electronic and magnetic properties that could be tunable by varying the diameter, number of concentric shells, and chirality of the tube.

U.S. Pat. No. 6,692,663 to Zhou et al. discloses compositions produced by solvent exchange methods where the compositions can be used as electrically conductive film coatings used on the glass of EC windows, and to coat carbon nanotubes thereby improving the electrical conductivity of the nanotubes. U.S. Pat. No. 6,217,843 to Homyonfer et al. disclose a method for producing fullerene-like metal chalcogenides which may be used as a conductor in electrochromic devices. U.S. Pat. No. 6,426,134 to Lavin et al. discloses melt-extruded SWNTs chemically bonded at one end to a polymer, and their use as electrically conducting film.

These methods do not provide transparent, conductive thin films for deposition on a glass or plastic substrate and processes used can be technically challenging and expensive for large-scale applications. Accordingly, the present invention provides methods and processes for the use of carbon nanotubes as electrodes, especially in smart windows.

SUMMARY

The present invention provides methods and processes for using single-walled carbon nanotubes (SWNTs) as electrodes, especially for use in smart windows. SWNTs can be synthesized by any one of the art methods, and can be fibers, bundles, or soot. In one aspect of the invention, the SWNTs are synthesized on the glass. In another aspect, the SWNTs are synthesized and then deposited on the glass or other substrate.

These and other aspects of the present invention will become evident upon reference to the following detailed description. In addition, various references are set forth herein which describe in more detail certain procedures or compositions, and are therefore incorporated by reference in their entirety.

DETAILED DESCRIPTION

I. Definitions

Figure 1:
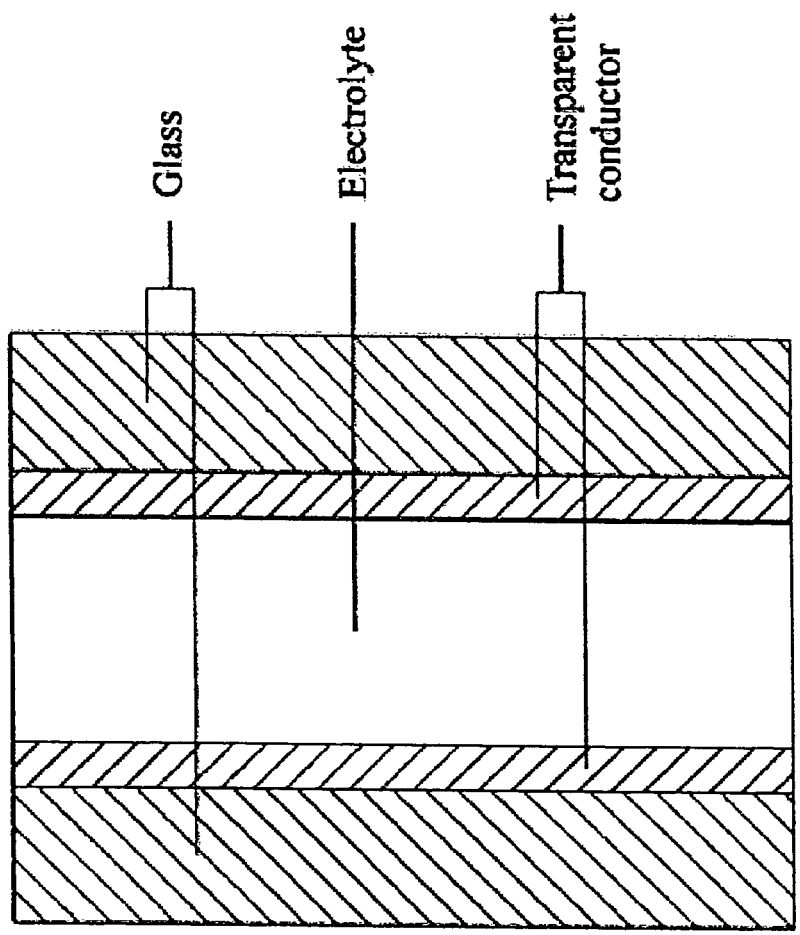
FIG. 1 illustrates an apparatus for carrying out the present invention.

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry $3^{rd}$ Ed." Vols. A and B, Plenum Press, New York, and Cotton et al. (1999) "Advanced Inorganic Chemistry $6^{th}$ Ed." Wiley, New York.

The terms "single-walled carbon nanotube" or "one-dimensional carbon nanotube" are used interchangeable and refer to cylindrically shaped thin sheet of carbon atoms having a wall consisting essentially of a single layer of carbon atoms, and arranged in an hexagonal crystalline structure with a graphitic type of bonding.

The term "multi-walled carbon nanotube" as used herein refers to a nanotube composed of more than one concentric tubes.

The terms "metalorganic" or "organometallic" are used interchangeably and refer to co-ordination compounds of organic compounds and a metal, a transition metal or metal halide.

II. Overview

The present invention discloses methods and processes for producing electrodes of single-walled carbon nanotubes (SWNTs). The SWNTs can be produced by any of the known methods, and then deposited on the substrate. Alternatively, the SWNTs can be produced directly on the substrate. When the substrate is glass, it can be used to make smart windows.

III. Synthesis of Carbon Nanotubes

The SWNTs can be fabricated according to a number of different techniques familiar to those in the art. For example, the SWNTs can be fabricated by the laser ablation method of U.S. Pat. No. 6,280,697, the arc discharge method of Journet et al. Nature 388: 756 (1997), the chemical vapor deposition method where supported metal nanoparticles can be contacted with the carbon source at the reaction temperatures according to the literature methods described in Harutyunyan et al., NanoLetters 2, 525 (2002), and the like. Preferably, the SWNTs are produced by the chemical vapor deposition method.

The chemical vapor deposition (CVD) method for the synthesis of carbon nanotubes uses carbon precursors, such as carbon containing gases. In general, any carbon containing gas that does not pyrolize at temperatures up to 800° C. to 1000° C. can be used. Examples of suitable carbon-containing gases include carbon monoxide, aliphatic hydrocarbons, both saturated and unsaturated, such as methane, ethane, propane, butane, pentane, hexane, ethylene, acetylene and propylene; oxygenated hydrocarbons such as acetone, and methanol; aromatic hydrocarbons such as benzene, toluene, and naphthalene; and mixtures of the above, for example carbon monoxide and methane. In general, the use of acetylene promotes formation of multi-walled carbon nanotubes, while CO and methane are preferred feed gases for formation of single-walled carbon nanotubes. The carbon-containing gas may optionally be mixed with a diluent gas such as hydrogen, helium, argon, neon, krypton and xenon or a mixture thereof.

The catalyst composition for use in CVD can be any catalyst composition known to those of skill in the art. Conveniently, the particles will be of a magnetic metal or alloy, such as, for example, iron, iron oxide, or a ferrite such as cobalt, nickel, chromium, yttrium, hafnium or manganese. The particles useful according to the invention will preferably have an average overall particle size of up to 50 nm to about 1 µm, although, in general, the particle sizes for individual particles can be from about 400 nm to about 1 µm.

The function of the catalyst when used in the carbon nanotube growth process is to decompose the carbon precursors and aid the deposition of ordered carbon. The methods and processes of the present invention preferably use metal nanoparticles as the metallic catalyst. The metal or combination of metals selected as the catalyst can be processed to obtain the desired particle size and diameter distribution, and can be separated by being supported on a material suitable for use as a support during synthesis of carbon nanotubes. As known in the art, the support can be used to separate the catalyst particles from each other thereby providing the catalyst materials with greater surface area in the catalyst composition. Such support materials include powders of crystalline silicon, polysilicon, silicon nitride, tungsten, magnesium, aluminum and their oxides, preferably aluminum oxide, silicon oxide, magnesium oxide, or titanium dioxide, or combination thereof, optionally modified by addition elements, are used as support powders. Silica, alumina and other materials known in the art may be used as support, preferably alumina is used as the support.

The metal catalyst can be selected from a Group V metal, such as V or Nb, and mixtures thereof, a Group VI metal including Cr, W, or Mo, and mixtures thereof, VII metal, such as, Mn, or Re, Group VIII metal including Co, Ni, Ru, Rh, Pd, Os, Ir, Pt, and mixtures thereof, or the lanthanides, such as Ce, Eu, Er, or Yb and mixtures thereof, or transition metals such as Cu, Ag, Au, Zn, Cd, Sc, Y, or La and mixtures thereof. Specific examples of mixture of catalysts, such as bimetallic catalysts, which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Pt—Cr, Pt—W, and Pt—Mo. Preferably, the metal catalyst is iron, cobalt, nickel, molybdenum, or a mixture thereof, such as Fe—Mo, Co—Mo and Ni—Fe—Mo.

The metal, bimetal, or combination of metals are used to prepare metal nanoparticles having defined particle size and diameter distribution. The catalyst nanoparticles can be prepared by thermal decomposition of the corresponding metal salt added to a passivating solvent, and the temperature of the solvent adjusted to provide the metal nanoparticles, as described in the co-pending and co-owned U.S. patent application Ser. No. 10/304,316, or by any other method known in the art. The particle size and diameter of the metal nanoparticles can be controlled by using the appropriate concentration of metal in the passivating solvent and by controlling the length of time the reaction is allowed to proceed at the thermal decomposition temperature. The metal salt can be any salt of the metal, and can be selected such that the salt is soluble in the solvent and/or the melting point of the metal salt is lower than the boiling point of the passivating solvent. Thus, the metal salt contains the metal ion and a counter ion, where the counter ion can be nitrate, nitrite, nitride, perchlorate, sulfate, sulfide, acetate, halide, oxide, such as methoxide or ethoxide, acetylacetonate, and the like. For example, the metal salt can be iron acetate ($FeAc_2$), nickel acetate ($NiAc_2$), palladium acetate ($PdAc_2$), molybdenum acetate ($MoAc_3$), and the like, and combinations thereof. The melting point of the metal salt is preferably about 5° C. to 50° C. lower than the boiling point, more preferably about 5° C. to about 20° C. lower than the boiling point of the passivating solvent. The solvent can be an ether, such as a glycol ether, 2-(2-butoxyethoxy)ethanol, $H(OCH_2CH_2)_2O(CH_2)_3CH_3$, which will be referred to below using the common name dietheylene glycol mono-n-butyl ether, and the like.

Preferably, the support material is added to the reaction mixture containing the metal salt. The support material can be added as a solid, or it can be first dissolved in the passivating solvent and then added to the solution containing the metal salt. The solid support can be silica, alumina, MCM-41, MgO, $ZrO_2$, aluminum-stabilized magnesium oxide, zeolites, or other supports known in the art, and combinations thereof. For example, $Al_2O_3$—$SiO_2$ hybrid support could be used. Preferably, the support material is soluble in the passivating solvent. In one aspect, the counterion of the metal salt and the support material is the same, thus, for example, nitrites can be the counterion in the metal salt and in the support material. Thus, the support material contains the element of the support material and a counter ion, where the counter ion can be nitrate, nitrite, nitride, perchlorate, sulfate, sulfide, acetate, halide, oxide, such as methoxide or ethoxide, acetylacetonate, and the like. Thus, for example, nitrites can be the counterion in metal ions (ferrous nitrite) and in the support material (aluminum nitrite), or the support can be aluminum oxide ($Al_2O_3$) or silica ($SiO_2$). The support material can be powdered thereby providing small particle sizes and large surface areas. The powdered support material can preferably have a particle size between about 0.01 µm to about 100 µm, more preferably about 0.1 µm to about 10 µm, even more preferably about 0.5 µm to about 5 µm, and most preferably about 1 µm to about 2 µm. The powdered support material can have a surface area of about 50 to about 1000 m²/g, more preferably a surface area of about 200 to about 800 m²/g. The powdered oxide can be freshly prepared or commercially available. For example, a suitable $Al_2O_3$ powder with 1-2 µm particle size and having a surface area of 300-500 m²/g is commercially available from Alfa Aesar of Ward Hill, Mass., or Degussa, N.J. Powdered oxide can be added to achieve a desired weight ratio between the powdered oxide and the initial amount of metal used to form the metal nanoparticles. Typically, the weight ratio can be between about 10:1 and about 15:1. For example, if 100 mg of iron acetate is used as the starting material, then about 320 to 480 mg of powdered oxide can be introduced into the solution. The weight ratio of metal nanoparticles to powdered oxide can be between about 1:1 and 1:10, such as, for example, 1:1, 2:3, 1:4, 3:4, 1:5, and the like.

After forming a homogenous mixture, metal nanoparticles are formed during the thermal decomposition. The thermal decomposition reaction is started by heating the contents of the reaction vessel to a temperature above the melting point of at least one metal salt in the reaction vessel. The average particle size of the metal nanoparticles can be controlled by adjusting the length of the thermal decomposition. Typical reaction times range from about 20 minutes to about 2400 minutes, depending on the desired nanoparticle size. Metal nanoparticles having an average particle size of about 0.01 nm to about 20 nm, more preferably about 0.1 nm to about 3 nm and most preferably about 0.3 nm to 2 nm can be prepared. The metal nanoparticles can thus have a particle size of 0.1, 1, 2, 3, 4, 5, 6, 7, 8, 9, or 10 nm, and up to about 20 nm. In another aspect, the metal nanoparticles can have a range of particle size, or diameter distribution. For example, the metal nanoparticles can have particle sizes in the range of about 0.1 nm and about 5 nm in size, about 3 nm and about 7 nm in size, or about 5 nm and about 11 nm in size.

The supported metal nanoparticles can be aerosolized by any of the art known methods. In one method, the supported metal nanoparticles are aerosolized using an inert gas, such as helium, neon, argon, krypton, xenon, or radon. Preferably argon is used. Typically, argon, or any other gas, is forced through a particle injector, and into the reactor. The particle injector can be any vessel that is capable of containing the supported metal nanoparticles and that has a means of agitating the supported metal nanoparticles. Thus, the catalyst deposited on a powdered porous oxide substrate can be placed in a beaker that has a mechanical stirrer attached to it. The supported metal nanoparticles can be stirred or mixed in order to assist the entrainment of the catalyst in the transporter gas, such as argon.

Thus, the nanotube synthesis generally occurs as described in the co-pending and co-owned application U.S. Ser. No. 10/727,707, filed on Dec. 3, 2003. An inert transporter gas, preferably argon gas, is generally passed through a particle injector. The particle injector can be a beaker or other vessel containing the growth catalyst supported on a powdered porous oxide substrate. The powdered porous oxide substrate in the particle injector can be stirred or mixed in order to assist the entrainment of the powdered porous oxide substrate in the argon gas flow. Optionally, the inert gas can be passed through a drying system to dry the gas. The argon gas, with the entrained powdered porous oxide, can then be passed through a pre-heater to raise the temperature of this gas flow to about 400° C. to about 500° C. The entrained powdered porous oxide is then delivered to the reaction chamber. A flow of methane or another carbon source gas and hydrogen is also delivered to the reaction chamber. The typical flow rates can be 500 sccm for argon, 400 sccm for methane, and 100 sccm for He. Additionally, 500 sccm of argon can be directed into the helical flow inlets to reduce deposition of carbon products on the wall of the reaction chamber. The reaction chamber can be heated to between about 300° C. and 900° C. during reaction using heaters. The temperature is preferably kept below the decomposition temperature of the carbon precursor gas. For example, at temperatures above 1000° C., methane is known to break down directly into soot rather than forming carbon nanostructures with the metal growth catalyst. Carbon nanotubes and other carbon nanostructures synthesized in reaction chamber can then be collected and characterized.

In one aspect of the invention, the diameter distribution of the synthesized SWNTs is substantially uniform. Thus, about 90% of the SWNTs have a diameter within about 25% of the mean diameter, more preferably, within about 20% of the mean diameter, and even more preferably, within about 15% of the mean diameter. Thus, the diameter distribution of the synthesized SWNTs can be about 10% to about 25% within the mean diameter, more preferably about 10% to about 20% of the mean diameter, and even more preferably about 10% to about 15% of the mean diameter.

In one aspect, the prepared nanotube sample can be composed of a mixture of metallic-type carbon SWNTs and semi-conducting-type carbon SWNTs. The nanotube sample may be of any size that is convenient for processing within the microwave cavity. In an embodiment, the prepared nanotube sample weighs approximately 100 mg. In another embodiment, the prepared nanotube sample weighs between about 10 milligrams and 10 grams.

In another aspect, the prepared carbon nanotube sample can contain additional materials formed during synthesis of the carbon nanotubes, such as amorphous carbon created as a reaction byproduct during synthesis of carbon nanotubes by CVD or laser vaporization. Further, the SWNTs can contain materials added to facilitate carbon nanotube synthesis, such as metal nanoparticles used as a growth catalyst. In still another embodiment, the prepared carbon nanotube sample may contain low levels of additional materials, such as trace levels of metals or other impurities.

In another aspect, the SWNTs can be optionally further treated to remove additional conductive or ferromagnetic materials. For example, SWNTs synthesized by CVD growth on a growth catalyst composed of metal nanoparticles can optionally be treated with an acid to remove the metal nanoparticles. The treatment removes the conductive or ferromagnetic materials that are present in sufficient amount to interact with microwave energy and produce significant heating.

IV. Carbon Nanotubes as Electrodes

The SWNTs synthesized above can be deposited on a substrate for use as an electrode. The substrate can be a solid substrate, such as glass, mica, silicon, fiberglass, Teflon®, ceramics, plastic (including acrylics, polystyrene and copolymers of styrene and other materials, polypropylene, polyethylene, polybutylene, polycarbonate, polyurethanes, and the like), and quartz. The substrate can have any shape, such a rectangular, circular, rambazoid, square, and the like. The electrodes, such as SWNTs, can be deposited on the surface of the solid substrate.

The electrodes on the solid substrate can generally be prepared in a wide variety of ways. For example, electrodes can be deposited on a surface via vacuum deposition processes (sputtering and evaporation), lithography, screen-printing or solution deposition (electroplating or electroless processes). In one aspect, the electrodes are SWNTs, and SWNTs can be deposited on the surface of the substrate using solution deposition. Typically, the SWNTs can be suspended in a solvent at a concentration of about 0.1% by weight to about 1% by weight. The solvent can be water, organic solvent, or an aqueous solvent. The organic solvents include alkanes, alcohols, aryl and heteroaryl solvents, such as, for example, pentane, hexane, methanol, ethanol, isopropanol, butanol, 2-ethylhexanol, isophorone, 2-methoxypentanone, ethylene and propylene glycol and the monoethyl, monobutyl and monohexyl ethers of ethylene or propylene glycol, benzyne, chlorobenzyne, xylenes, pyridine, pyrrole, tetrahydrofuran, tetrahydropyran, and the like. Organic solvents also include polar, aprotic solvents such as acetone, acetonitrile, dimethylformamide, dioxane, ethyl acetate, ethyl ether, and hexamethylphosphoramide. The aqueous solvents include a mixture of water and organic solvent in a ratio of about 1:99 (v/v) to about 99:1 (v/v), or any ration in between.

In the preparation of the dispersion of SWNTs, a surfactant may be added to uniformalize the dispersion of SWNTs in the solvent. The surfactant can be selected such that it decomposes at a temperature lower than the temperature at which the SWNTs undergo oxidation. Specific examples of the surfactant employable herein include sodium dodecylsulfate (SDS), benzalconium chloride, and the like.

The coating method is not limited to spray coating. If a dispersion is used, spin coating or dipping may be effected. Alternatively, the SWNTs in the form of powder may be directly attached to the surface of the substrate.

The substrate thus sprayed with the solution containing the SWNTs can be subjected to evaporation of solvent. The substrate having the SWNTs disposed thereon can be air-dried or can be heated to remove the solvent (heating step). Preferably, the heating temperature is lower than the temperature at which the SWNTs combust.

The deposition of the SWNTs should not decrease the absolute transmission of light of the substrate by more than about 30%, preferably by not more than about 20%, or even more preferably by not more than about 15%. The change in transmission can be measured at any wavelength, such as, for example, in the visible range, such as 550 nm.

EC Device

The substrates having carbon nanotubes and nanostructures deposited thereon produced by the methods and processes described above can be used in applications that include Field Emission Devices, Memory devices (high-density memory arrays, memory logic switching arrays), Nano-MEMs, AFM imaging probes, distributed diagnostics sensors, strain sensors, and thermal control materials. One aspect of the present invention is directed to specific EC devices utilizing the substrates produced as described above. A typical EC device includes an upper and a lower layer of a substrate, such as glass, having transparent electrodes deposited thereon and a solid or liquid electrolyte in between, as schematically illustrated in FIG. 1. When a voltage is applied to the EC device, the electrolyte undergoes a color change.

In an EC device, the electrolyte layer must be ionically conductive, but electrically insulating. Both poly(vinyl chloride)(PVC) based and polymethylmetracrylate (PMMA) based gel electrolytes containing lithium perchlorate ($LiClO_4$) can be employed for solid electrolyte layer. Preferably, solid electrolyte layer is fabricated from PVC (or PMMA), propylene carbonate (PC), ethylene carbonate (EC) and $LiClO_4$. The PVC (or PMMA) electrolyte mixture can be dissolved in an organic solvent, such as tetrahydrofuran (THF).

A useful gel electrolyte can be prepared from 3% $LiClO_4$, 7% PMMA, 20% PC and 70% acetonitrile (ACN)(% by weight). A simple synthesis of such a gel is achieved by first dissolving the PMMA and $LiClO_4$ in ACN. PC, dried over molecular sieves, can be combined with the other ingredients. The complete mixture is typically stirred for 10-14 hours at room temperature to form the high conductivity (2 mS/cm), high viscosity and transparent gel electrolyte. As described above, the solid polymer matrix of PMMA provides dimensional stability to the electrolyte, while the high permittivity of the solvents PC and ACN enable extensive dissociation of the lithium salt.

In another aspect of the invention, liquid electrolytes can be used in an EC device. One such liquid electrolyte can be achieved using 0.1M tetrabutylammonium perchlorate (TBAP) in ACN.

In another aspect of the invention, the glass substrate can be coated with indium tin oxide (ITO) on one side to form a transparent insulating substrate for the counter-electrode. The ITO layer is preferably from about 10 nm to about 200 nm thick. The SWNTs are then deposited onto the ITO layer.

A sample device can be constructed using ITO coated rectangular glass slides. SWNTS were deposited on the ITO coated surface. A $PMMA/LiClO_4$ gel electrode was uniformly placed between two glass slides with the SWNT containing side in contact with the gel, thereby forming a layered device.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Preparation of the Supported Catalyst

Catalysts were prepared by impregnating support materials in metal salt solutions. In a typical procedure, $Fe(NO_2)_2$ was used at a molar ratio of Fe:Al of 1:2. Under a nitrogen atmosphere, $Fe(NO_2)_2$ was added to water in the molar ratio of 1 mM:20 mM. Then aluminum nitrite was added to the metal salt containing aqueous solution. The reaction mixture was mixed using a mechanical stirrer under the nitrogen atmosphere, and heated under reflux for 90 minutes. The reaction was cooled to about 60° C. while flowing a stream of $N_2$ over the mixture to remove the solvent. A black film formed on the walls of the reaction flask. The black film was collected and ground with an agate mortar to obtain a fine black powder.

Example 2

Synthesis of Carbon Nanotubes

Carbon nanotubes were synthesized by using the experimental setup described in Harutyunyan et al., NanoLetters 2, 525 (2002). CVD growth of bulk SWNTs used the catalysts prepared in Example 1 and methane as a carbon source (T=800° C., methane gas flow rate 60 sccm). The carbon SWNTs were successfully synthesized with a yield of about 40 wt % (wt % carbon relative to the iron/alumina catalyst). Analysis of transmission electron microscopy (TEM) images of SWNTs produced showed bundles were produced. Raman spectra of carbon SWNTs produced using produced by the method above were obtained using $\lambda=532$ nm and $\lambda=785$ nm laser excitation.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

I claim:

1. An electrochromic device, the device comprising:
a first transparent electrode, a second transparent electrode, and an electrolyte positioned between the first and second transparent electrodes, wherein the first and second transparent electrodes each comprise substantially the same composition of carbon single-walled nanotubes (SWNTs) deposited on a substrate to provide the electrode wherein the electrode is transparent and electrically conductive; and wherein the device has a visible light transmittance of greater than 70%.

2. The electrochromic device of claim 1, wherein the substrate is selected from the group consisting of glass, mica, silicon, fiberglass, Teflon®, ceramics, plastic, and quartz.

3. The electrochromic device of claim 2, wherein the substrate is glass.

4. The electrochromic device of claim 2, wherein the substrate is quartz.

5. The electrochromic device of claim 1, wherein the electrolyte is poly(vinyl chloride) (PVC) or polymethylmetracrylate (PMMA).

6. The electrochromic device of claim 5, wherein the electrolyte further comprises lithium perchlorate ($LiClO_4$).

7. The electrochromic device of claim 1, wherein the electrolyte comprises $LiClO_4$, PMMA, propylene carbonate and acetonitrile.

8. The electrochromic device of claim 1, wherein the electrolyte comprises tetrabutylammonium perchlorate and acetonitrile.

* * * * *